May 17, 1938.  E. A. LINDSLEY  2,117,767
ELECTROCUTING TRAP
Filed April 16, 1934  2 Sheets-Sheet 1
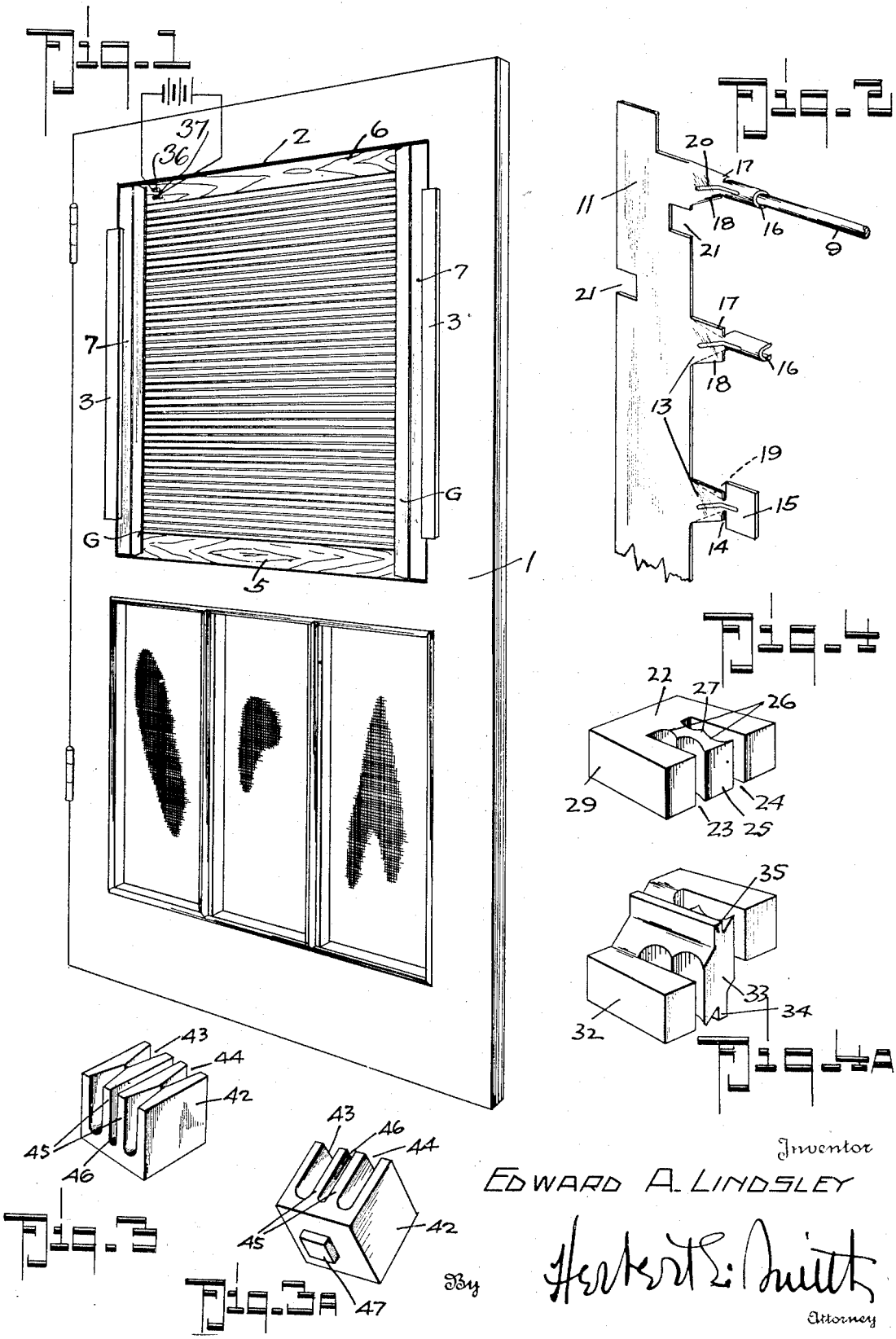
Inventor
EDWARD A. LINDSLEY
By Herbert E. Smith
Attorney May 17, 1938.  E. A. LINDSLEY  2,117,767
ELECTROCUTING TRAP
Filed April 16, 1934  2 Sheets-Sheet 2
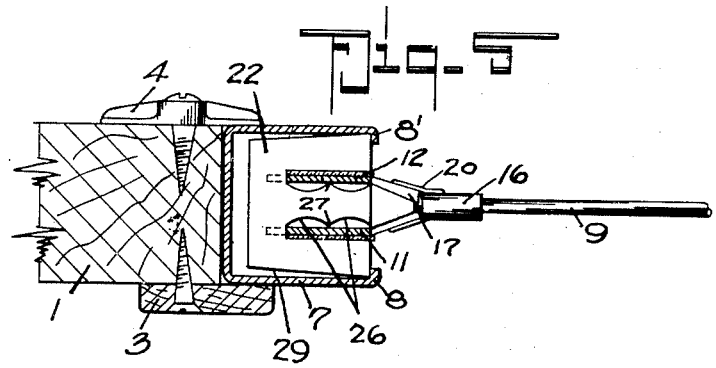
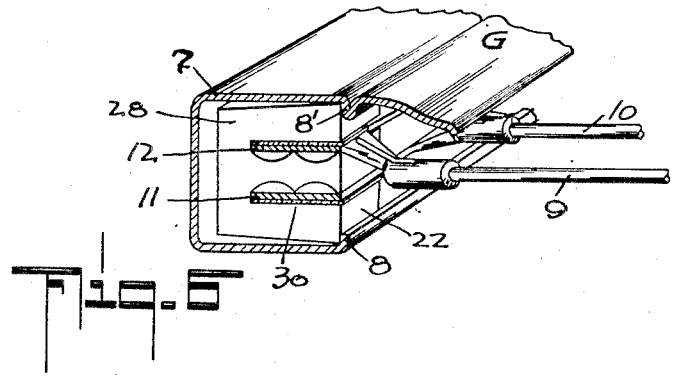
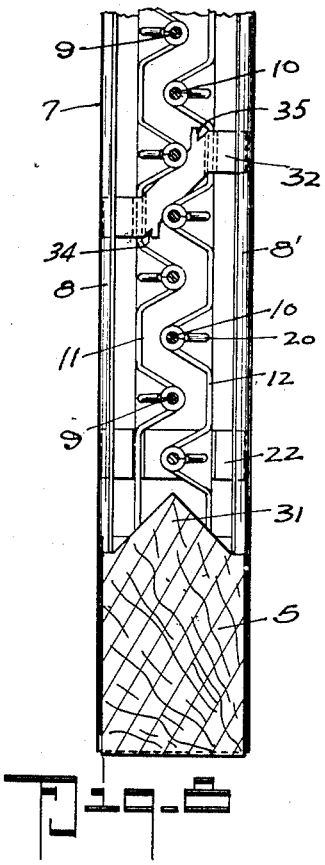
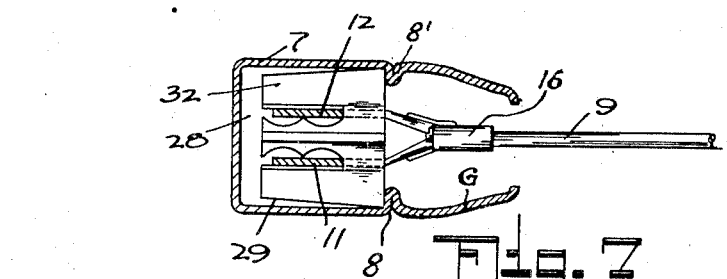
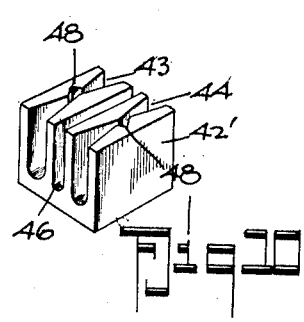
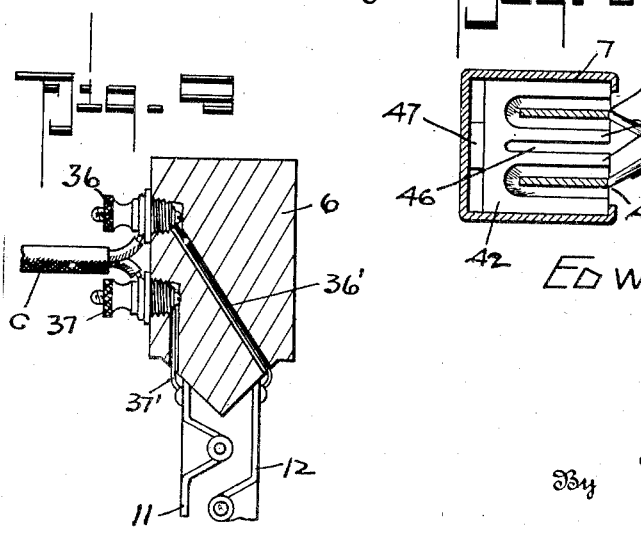
Edward A. Lindsley
Inventor
By Herbert E. Smith
Attorney Patented May 17, 1938

2,117,767

UNITED STATES PATENT OFFICE 2,117,767

ELECTROCUTING TRAP

Edward A. Lindsley, Sycamore, Ill., assignor to National Electric Screen Co., Chicago, Ill., a corporation of Illinois Application April 16, 1934, Serial No. 720,704

17 Claims. (Cl. 43—112)

My present invention relates to improvements in electrocuting traps for flies and other insects, in which traps two parallel, spaced electrical conductors of different polarity are employed, to which the flies are expected to approach sufficiently close to create an arcing and therefore a short circuit which results in the extermination of the victim.

While the trap of my invention is readily adapted for a wide variety of purposes and uses, I have, for convenience, illustrated and described, as a specific exemplification of the invention, a screen-panel as used in a door, or in a window.

In carrying out my invention I utilize a screen-panel, or trap-panel, which, due to its construction, may be fashioned in strong and rugged manner for some purposes and uses, or, as here illustrated, the trap-panel may be of light construction for use in windows or doors against admission of flies and other insects.

The invention consists in certain novel combinations and arrangements of parts involving the trap-panel and its construction, as will hereinafter be more fully set forth and claimed. In the accompanying drawings I have illustrated one complete example of the physical embodiment of my invention wherein the parts are combined and arranged according to one mode I have thus far devised for the practical application of the principles of my invention. But it will be understood that various changes and alterations are contemplated, and may be made, in the exemplified structure within the scope of my claims, without departing from the principles of the invention.

Figure 1 is a perspective view of a conventional screen-door equipped with one of the trap-panels of my invention.

Figure 2 is a perspective view at the upper end of one of four headers used in the trap, showing the manner of attaching the electrocuting bars or conductors to the headers.

Figure 3 is a perspective view of one of the insulating anchor-blocks for the headers, and Figure 3a is a perspective view of the back surface of the header block of Figure 3.

Figure 4 is a perspective view of a modified form of a header block and Figure 4a is a similar view of a slightly modified form of the block.

Figure 5 is a horizontal, transverse section (looking down) at one edge of the panel-trap, showing a manner of detachably fastening the panel in the door opening.

Figure 6 is a detail perspective view of a section of the panel, detached from the door, and Figure 7 is a sectional view through one of the rails of the panel, showing a modified form of fastening the headers in the side rails.

Figure 8 is a vertical, sectional view at the bottom portion of the panel showing the bottom bar in section, as well as the electrocuting bars of the trap and also showing both of the anchoring blocks of Figures 3 and 4 in use.

Figure 9 is a similar view to Figure 8 but taken at the top portion of a panel and indicating a method of making the electrical connections.

Figure 10 is a perspective view of a header block similar to that of Figure 3 with slight modification.

Figure 11 is a sectional view through one of the rails of the panel showing the method of fastening the headers of Figure 3 in the side rails.

In order that the general arrangement and utility of the parts of the trap may readily be understood I have shown in Figure 1 a conventional door 1 having an upper panel-opening 2, with side stops 3, 3, at the outer side of the door, and the door is equipped with the detachable trap-panel that is held against the outer stops 3, 3, by the inner turn-buttons 4. Any other suitable means may be employed for fastening the trap-panel in place within the door opening, and it will also be understood that the panel may be used as a window-screen in lieu of the usual sash, or the panel may be employed in other manners or modes for accomplishing various other purposes.

The trap-panel, or screen, which as shown here is of rectangular shape is fashioned with a bottom bar 5 and a top bar 6, both of which are shown as made of wood and the panel has two upright metal channel rails as 7, 7, that are rigidly joined in suitable manner to the bottom and top bars of the panel. These side rails are open at their adjoining inner sides, and they are each fashioned with a pair of opposed, in-turned, upright edges 8 and 8' that form retaining flanges at opposite sides of the open adjoining faces of these side rails.

The electric conductors which form the electrocuting elements, comprise two sets of cross bars 9 and 10, the bars of the sets being arranged alternately on a vertical plane, as indicated in Figures 1 and 8, and these parallel bars are spaced apart the proper distance so that a fly coming between two adjoining bars will be electrocuted. These electrocuting bars are fashioned of suitable material that is a good conductor of electricity, as for instance, duralumin, and this material is also light in weight, strong and durable. One set of bars, as 9 has a negative polarity and the other set, 10, has a positive polarity, and the bars are arranged so that when they are charged, there is just sufficient electricity to avoid arcing, until a fly or other insect interposes itself therebetween. When this occurs the distance between the electrodes is bridged, and the resultant short circuit kills the victim. These bars, due to their strength and stiffness do not sag, but maintain a uniform space between adjoining parallel bars, at all times, and because of their strength and stiffness, it is not necessary to employ means for holding them under tension, as is the case with "wires" when used for a similar purpose.

Each set of electrocuting bars, at its ends, is anchored to a header, as 11 and 12, which headers are good conductors of electricity and two of these headers, of opposite polarity, are connected in a suitable manner to a source of electricity, as for instance, a transformer may be employed in a circuit in connection with a house current, for supplying electricity to the two sets of bars.

One pair of these headers 11 and 12 is enclosed in each of the hollow side rails of the trap or panel, and the sets of electrocuting bars are attached at their opposite ends to the headers in a manner indicated in Figure 2. At the attaching edge of the header a series of vertically spaced offset lugs 13 is fashioned, preferably integral with the header, and these lugs are notched above and below, as at 14 to form a neck, which neck terminates in a rectangular head 15. The upper and lower edges of the head are adapted to be rolled or folded over to form a supporting sleeve 16 for an end of an electrocuting bar, and the sleeve is tightly clamped on the end of the bar. To strengthen the joint structure the upper edge 17 and the lower edge 18 of the lug 13 are bent or folded on the lug, as at the dotted lines 19 at the bottom of Figure 2, and if necessary reinforcing ribs 20 may be employed to strengthen the joint. In this manner the opposite ends of an electrocuting bar are fastened to the headers, and the joints are preferably soldered, or welded, to make a close fit and fastening, as well as to provide an efficient electrical connection between the bar and its header.

The headers may be provided on their edges with notches or recesses as 21, 21 in Figure 2 which may, in some instances, be employed in fixing the headers in the hollow rails. The headers are of course insulated from the rails, and for this purpose I employ anchoring blocks 22 in suitable numbers, that contact with both the headers and the rails. These blocks, which are fashioned of suitable material, are each fashioned with a pair of spaced vertical notches 23 and 24 that form a central tongue 25 at the inner side of the block, and the opposite walls of these tongues are fashioned with curved faces 26 that provide comparatively sharp contact edges 27 for frictional engagement with the inner, adjoining faces of the pair of headers in each rail. As shown the headers are slipped into the notches of the blocks, and the blocks fit into the rail, and are retained therein by means of the flanges 8 and 8'.

In some instances the blocks may have their notches at the inner open sides of the two rails, while in other instances, as in Figure 7, the blocks may be provided with notches on the end of the block that adjoins the outer, closed side of the rail.

In all instances, however, I preferably provide a vertical space 28 between the other solid wall of the rail and the adjoining face or end of the anchoring blocks in the rail, and this space is furnished for ventilation, and for drainage of moisture that might possibly have access to the interior of the side rails. This drainage space is increased in size by the use of tapering side walls as 29 on the blocks, and these tapered walls permit the insertion and retention of the blocks in the rails, in such manner that the fixed position of the bars is maintained by coaction of the corners of the blocks with the complementary inturned retaining flanges 8 and 8' of the side rails.

In Figures 1 and 6 the side rail is equipped with an integral weather strip or guard G on the outside of the panel. This guard is integral with one of the retaining flanges and it projects outwardly from the rail and inwardly toward the bars, to guard against access of rain to the interior of the hollow side rail. These flanges or guards G, at their free edges, terminate in proximity to the electrocuting bars, and in addition to their functions as weather-strips or rain shields, these flanges also prevent flies from entering the hollow side rails where they might be caught and cause trouble in the circuits.

As is well known a corona is formed about the electrocuting bars, which is also formed between the ends of these bars and the enclosing metal side rails of the frame, thus insects will not pass through the space between the frame and screen or ends of the bars. When an insect attempts to pass through the space between the element G and the screen an electrical charge is transmitted to him which causes him to recede from the space between the element G and the screen, before he comes close enough to the electrocuting bars to cause his electrocution. The potential of the side bars of the frame and the element G, however, is always at or near zero, as the amount of the charge of electricity received by the frame from the positive conductors of the screen is counteracted by the charge from the negative conductors or rods, and vice versa.

If desired, an insulating packing strip may also be employed as shown at 30 in Figures 5 and 6, and these strips are located in the notches of the anchoring blocks between a flat wall of a notch and the flat face of a header, to insure a tight joint between the blocks and the headers, and to act as anti-rattlers or cushions for absorbing vibrations arising in the bars.

The bottom bar 5, as seen in Figure 8 may be provided with sharply bevelled edges to provide a peak as 31 that is alined parallel with the two series of electrocuting bars, and it will be apparent that an electrocuted fly, falling down from the trap, will slide down one of the inclined faces and be disposed of in order to prevent accumulation of exterminated insects in the door structure.

In the modified form of the anchoring block in Figure 4a the blocks as 32 are divided by notches to form the center tongue 33 and the opposite side portions of the blocks are at different levels, or "staggered", while the tongue is provided with a bottom flange 34 and a top flange 35. One of these blocks is shown in use in the upper portion of Figure 8, and also in Figure 7, as separating the headers of opposite polarity, and also for anchoring the electrocuting bars in the side rail. This staggered arrangement is specially desirable where the bars are placed under tension, but particularly in view of the fact that the two headers in a rail are of different polarity and they should be separated as much as possible. To this end the flanges 34 and 35 of the block guard the insulator against short circuiting, or passage of current along the electrocuting bars, from one to another adjacent to the headers, by increasing the distance that the current would have to travel. And as indicated in Figure 8 the electrocuting bars, i. e. two of said bars, are braced by the pair of flanges 34 and 35 of each of the staggered-blocks, to maintain all of the bars in their alined, vertical plane.

The slanting, intermediate portion of the block of Figure 4a also forms a water-shed that prevents accumulation of a film of water or moisture on the block. Such film of moisture, it will readily be apparent, might be the means of short circuiting the current between the adjoining electrocuting bars, of different polarity.

The venting, vertical space between the solid wall of the rail and the enclosed end of the blocks, and the spaces at the sides of the blocks, also assist, by increasing the effects of evaporation, in preventing any substantial accumulation of moisture in proximity to any pair of the bars.

The number of anchoring blocks employed may be varied to fulfill various different conditions, and as indicated in Figure 8, the blocks may be spaced at the desired or required intervals for properly anchoring the structure made up of the two pairs of headers and the two series of electrocuting bars. The size of the bars, in cross section, may be varied, but in all cases the inherent rigidity or stiffness of the bars maintains complementary bars of a pair at their predetermined distance apart, and this distance remains uniform throughout the length of the bars.

While the trap in Figure 1 and Figure 5 is illustrated as an attachment for a door-opening, it will be understood, of course, that the trap may be detached from the door, and employed as a unit, as for instance, as a window screen, or in some cases, in addition to its use as a screen against insects, the trap may be employed as a barrier or guard against intrusion.

In order to effect the electrical connection of the two headers 11 and 12 to their source of energy, which may be through a transformer, I mount two binding posts 36 and 37 on the top rail 6, from which I run wires 36' and 37' which are in turn secured or soldered respectively to headers 11 and 12. Wires forming cable C carry the electricity from the transformer.

In certain instances it is desirable to operate the electrical circuit of the device of my invention with a higher voltage electricity than normal and in order to guard against arcing at the anchoring blocks, I have provided the blocks 42 of Figures 3 and 10. Also, where the device has to operate in exceedingly damp air, such as fog or steam, moisture may collect on the anchor blocks and afford an electrical surface conductor which tends to increase arcing. Therefore, I have devised blocks 42 fashioned of a suitable insulating material, which are each fashioned with a pair of spaced, tapered vertical notches 43 and 44 that form central tongues 45 and slot 46. When the electrically charged headers are properly adjusted in slots 43 and 44 the distance of surface travel between the headers is so greatly increased by the provision of slot 46 that any adjustment of the voltage to the headers just below the point where arcing commences cannot possibly carry over by surface contact and arc at the anchoring blocks.

As a further provision and to aid evaporation thru a comparatively open structure, I have formed a slight projection 47 which causes the block when assembled in the side rails 7, 7 to abut against said rail and spaces the anchor block from the side rail.

In Figure 10 I have shown, in perspective, a modified form of anchor block 42' which is similar to that of Figure 3 with the exception that the tapered slots 43 and 44 each have a notch 48 which may be so constructed as to put a slight crimping grip on the headers 11 and serve to hold the blocks in place and also to afford a more rigid construction.

Having thus fully described my invention, what I claim as new and desire to secure by Letters Patent is:—

1. In an electrocuting trap, the combination with a header of flat metal, a lug integral with the header and having opposed notches whereby a supporting sleeve is formed on the lug of an electrocuting-bar mounted in the sleeve, and a soldered joint between said bar and sleeve.

2. The combination in an electrocuting trap with a hollow rail, of a pair of spaced parallel headers and two series of electrocuting bars of different polarity attached to said headers, a plurality of anchoring blocks of insulating material and means for retaining them in the rail, said blocks each having a spacing boss on one face for contact with the rail, and said blocks each having an integral tongue and notches forming sharp contact edges at opposite sides of the tongue to frictionally engage and support the headers.

3. In an electrocuting trap, the combination with a pair of hollow side rails, a pair of anchoring blocks in each rail, and a pair of spaced headers in each rail mounted in said blocks and having electrocuting bars attached thereto, of a pair of retaining flanges on each rail engaging said blocks, and one flange of each rail having an integral strip with its free edge terminating in proximity to said bars and forming a partial closure against access to the interior of the side rails.

4. In an electrocuting trap, the combination of a header of flat metal, a plurality of spaced lugs projecting from one edge of said header, a supporting sleeve integral with each lug, and a plurality of electrocuting bars each having an end mounted in a sleeve.

5. In an electrocuting trap including side rails and a bottom rail, the combination with a pair of laterally spaced, upright, insulated headers in each side rail, vertically spaced supports rigid with said headers and alined in a vertical plane adjacent the side rails, two series of alternating self-supporting horizontally extending electrocuting bars rigidly mounted in said supports, and said bottom rail having two oppositely inclined upper faces forming a peak parallel with said bars and located directly below said series of bars.

6. A member providing a support for a set of individual electrocuting bars of an electrocuting trap, said member having a plurality of elements formed of the material of an edge of said member spaced longitudinally of said member arranged in substantial alignment with each other and being offset with respect to said member respectively providing a clip for receiving and holding an individual bar to said member.

7. A member providing a support for a set of electrocuting bars of an electrocuting trap, said member having a plurality of elements spaced longitudinally of said member arranged in substantial alignment with each other and being offset with respect to said member respectively providing a sleeve for holding a bar at right angles to said member in a plane substantially parallel with said member.

8. A member providing a conductor and a support for a set of electrocuting bars of an electrocuting trap, said member having a plurality of elements spaced longitudinally of said member arranged in substantial alignment with each other and being offset with respect to said member respectively providing a clip for holding a bar at substantially a right angle to said member in a plane substantially parallel with said member and providing an electrical connection between said bar and member.

9. In a device of the kind described the combination of supports for a plurality of sets of electrocuting bars of an electrocuting trap, each of said supports having a plurality of elements spaced longitudinally of said support arranged in substantial alignment with each other and being offset with respect to said support respectively providing a clamp with which a bar may be connected to hold said bar to said support, said elements and bars of one support being located between and in spaced relation to the bars and elements of the other support, and a frame with which said supports are connected.

10. A support for a set of individual electrocuting bars of an electrocuting trap, said support being comprised of a single member formed with a plurality of integral spaced individual bar supporting lugs arranged longitudinally of said member, which respectively are formed to provide gripping means aligned with each other and disposed at one side of said member providing means for supporting the individual bars of said trap.

11. A device of the kind described comprised of a plurality of individual electrocuting units, each unit being comprised of a plurality of individual substantially straight electrocuting bars and a supporting member for said bars including means for connecting said bars in offset relation to the longitudinal axis of said member, said member providing means for maintaining the bars of one unit in spaced relation to each other and a frame for said units, the opposite ends of said bars being respectively extended into the opposite sides of the frame, said bars terminating at each end in spaced relation to adjacent portions of the frame.

12. A support for supporting a plurality of electrocuting bars of an electrocuting trap, said support consisting of a member having a plurality of connectors for respectively connecting a bar to said support, said connectors including a lug arranged at an angle to the longitudinal axis of said support and having means extending from said lug arranged at an angle to said lug, said means having a recess located upon opposite sides of each connector.

13. An electrical insect destroyer of the type described and having a pair of grid electrodes each consisting of a set of parallel stiff wires, members arranged transverse to said electrodes for spacing and connecting the wires of each grid consisting of a strip of sheet metal having gripping portions secured to said wires.

14. In an electric insect destroyer, the combination of a rectangular frame having wooden top and bottom members, and a pair of sheet metal side members which are U-shaped in cross-section and provide top and bottom seats for said top and bottom members, a pair of grid electrodes consisting each of a set of parallel wires, and means for supporting the wires of each grid consisting of a pair of cross-bars disposed one near each end of the grid wires, said cross-bars consisting of a sheet metal strip supported at its ends in abutting relation to said wooden members and disposed crosswise of said grid wires and formed with finger portions rigidly secured to said wires and said wires terminating adjacent the free edges of said U-shaped side members.

15. An electrical insect destroyer of the type described and having a pair of grid electrodes each consisting of a set of parallel stiff wires, cross-bar members for spacing and connecting the wires of each grid consisting of a strip of sheet metal formed with offset finger portions arranged at a right angle to said strip and rolled to form sockets arranged to make rigid engagement with said wires.

16. In a device of the kind described, the combination of a frame having an opening and positive and negative sets of electrodes located in said frame and extending beyond the opening of said frame, said electrodes being spaced from said frame at the ends and sides of said electrodes by a fluid dialectric, said frame and electrodes being arranged with respect to each other to provide for an electrical effect across said space, thereby providing means stopping the passage of insects through said space and around the ends of said electrodes.

17. In an electrocuting trap, the combination of a pair of grid electrodes, each consisting of a set of parallel stiff wires and supporting members connecting said wires of each grid, a frame to which said supporting members are connected, the ends of said wires being extended beyond the opening of said frame and being insulated from said frame at the ends of said wires by a fluid dialectric, said frame having a metallic element arranged with respect to said ends of said wires for electrical coaction with said ends of said wires.

EDWARD A. LINDSLEY.